Nov. 2, 1965   R. MALCOM, JR   3,215,453
FLIGHT LOG AND APPROACH CHART PRESENTATION APPARATUS
Filed Aug. 11, 1964   3 Sheets-Sheet 1
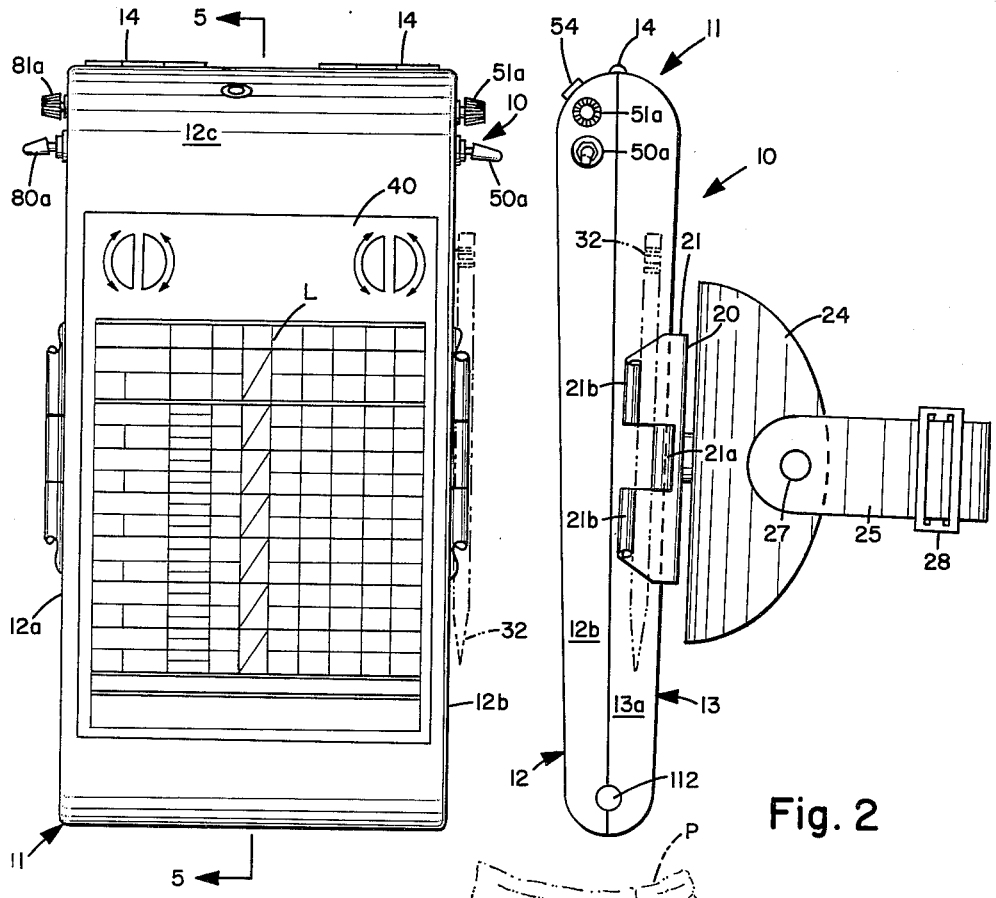
Fig. 1
Fig. 2
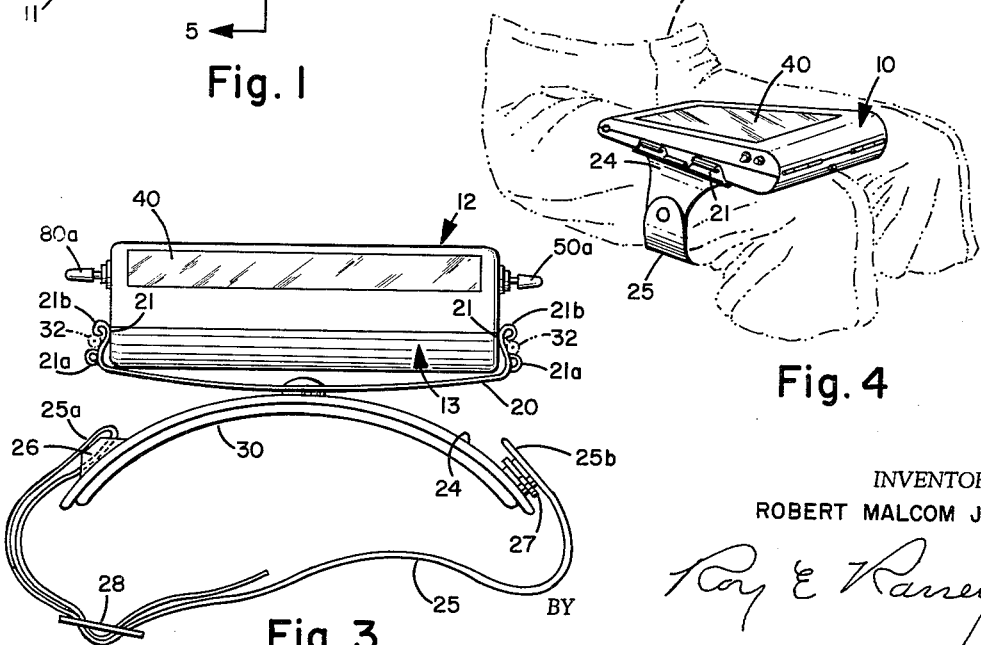
Fig. 3
Fig. 4
INVENTOR
ROBERT MALCOM JR.
BY Roy E. Raney
ATTORNEY

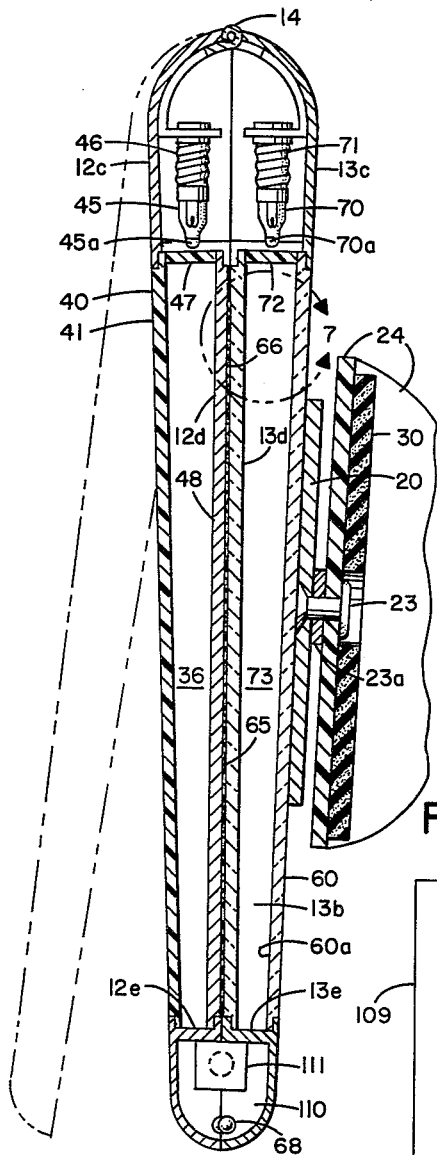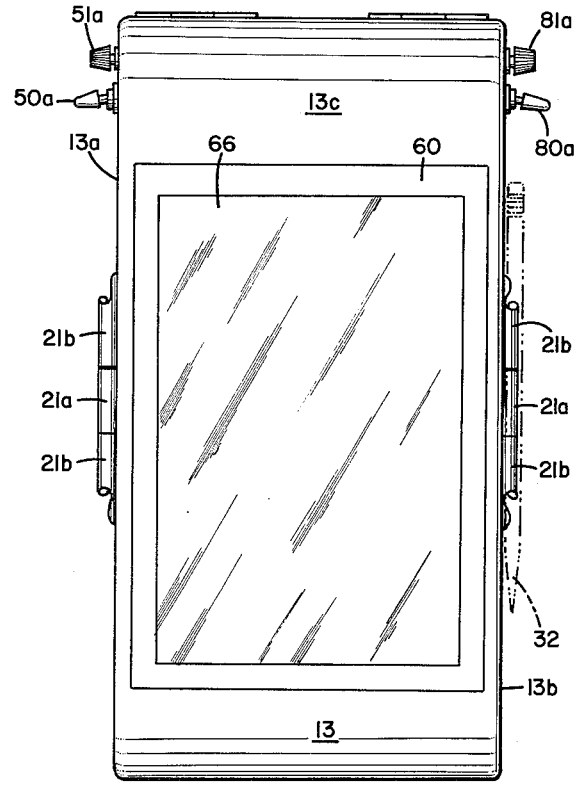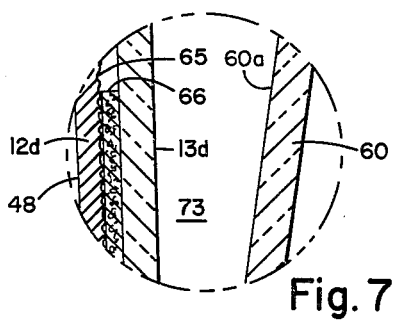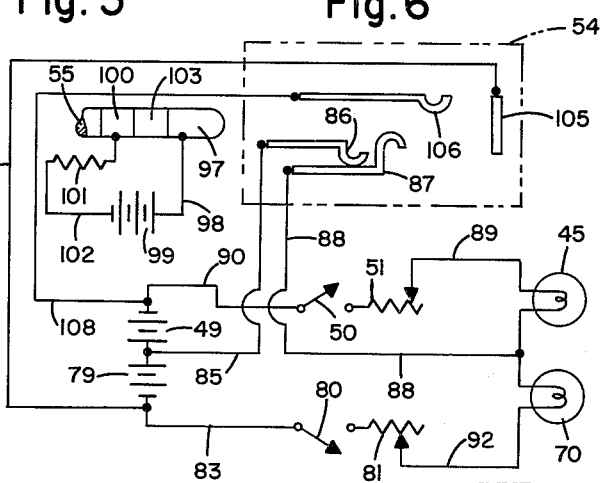

United States Patent Office 3,215,453
Patented Nov. 2, 1965

3,215,453
FLIGHT LOG AND APPROACH CHART
PRESENTATION APPARATUS
Robert Malcom, Jr., 232 Howard Ave.,
Indian Rocks Beach, Fla.
Filed Aug. 11, 1964, Ser. No. 388,883
8 Claims. (Cl. 281—44)

This invention relates to improvements in apparatus for use in keeping flight logs, and for presenting approach charts for use by aircraft pilots during flight.

It is the practice for pilots to maintain a written flight log, usually by filling in a printed form with pencilled notes relating to positional fixes, radio frequencies encountered, distances of various legs of travel, times en route, quantities of fuel used, and the like. This data is usually entered on a printed form having a size of approximately five inches by eight inches and, in the case of pilots flying without the assistance of co-pilots or navigators, keeping of the flight log absorbs a great deal of the pilot's attention. In addition, it is the practice to utilize printed approach charts for individual airports when approaching to make a landing. These approach charts are of about the same size as the flight log and normally carried in a notebook, clipboard, or the like.

It is a primary object of this invention to provide an improved apparatus for holding and illuminating a flight log and an approach chart, the apparatus being so constructed as to illuminate the log and approach chart without glare.

It is another object of this invention to provide a flight log and approach chart presentation apparatus which is conveniently held and positioned by the pilot for viewing and for writing thereon, and which apparatus comprises a housing which presents the flight log on one face thereof and the approach chart on the opposite face thereof so that either may be conveniently referred to by simply inverting the housing.

As another object, this invention aims to provide an improved flight log and approach chart presentation apparatus of the foregoing character comprising support means for supporting the housing on the thigh or knee of a pilot, the support means including a base member having a thigh strap and a clamp member which holds the housing with either the flight log section or the approach chart section facing upwardly for use by the pilot, the clamp member being pivoted to the base member for swiveling movement of the housing with respect to the thigh of the pilot for convenience in writing on the flight log section.

Yet another object of this invention is the provision of a flight log and approach chart presentation apparatus which, in a preferred form comprises a housing having first and second sections each including spaced side walls joined by a front wall and a rear wall spaced from the front wall, the sections being hinged together at one end for relative movement from a closed position in which the rear walls are in superimposed relation to an open position in which the rear walls are separated to permit a chart to be placed between said rear walls so as to be gripped thereby when in the closed position, the front wall of the first section comprising a translucent panel having a matte surface for receiving pencilled notations, the rear wall of the first section presenting a reflective surface toward said translucent panel, and means such as an electric lamp for introducing diffused light into the space between said front and rear walls of said first section for illuminating the translucent panel to display markings thereon to a viewer. In accordance with the invention, the rear wall of said second section comprises a first transparent panel for engaging a chart when gripped between both rear walls, and the front wall of said second section comprises a second transparent panel spaced from the first transparent panel to permit viewing of said chart through both of the transparent panels, the inwardly facing surface of the second transparent panel is partially mirrored, and means are included, such as a second electric lamp, for introducing diffused light between said transparent panels for illuminating said chart.

Still another object is the provision of an improved flight log and approach chart apparatus comprising first and second electric lamps for illuminating said translucent panel and said approach chart respectively, said apparatus further comprising first control means for said first lamp and second control means for said second lamp, said first and second control means being mounted on opposite sides of said housing in symmetrical relation to one another about a predetermined axis of said apparatus, whereby when said first housing section is uppermost said first control means will occupy a predetermined position with respect to an observer, and upon inversion of said housing about said axis so that the second section is uppermost said second control means will occupy said predetermined position.

As another object this invention aims to provide apparatus of the foregoing character wherein said first control means comprises a first switch for electrically connecting said first lamp to battery means carried in said housing, and said second control means comprises a second switch for electrically connecting said second lamp to battery means carried in said housing.

Another object of this invention is the provision of means for alternatively energizing said lamps from said battery means or from an external electrical power supply such as the electrical system of an aircraft, the lamp control means including variable resistance means for adjusting the intensity of illumination of the flight log and approach chart.

The invention may be further said to reside in certain constructions and arrangements of parts by which the foregoing objects and advantages as well as others are achieved, as will become apparent from the following detailed description of a preferred embodiment of the invention read in conjunction with the accompanying sheets of drawings forming a part of this specification, and in which:

FIG. 1 is a plan elevational view of a flight log and approach chart presentation apparatus embodying the present invention shown in one position of use;

FIG. 2 is a side elevation thereof as viewed from the right of FIG. 1;

FIG. 3 is an end elevation thereof as viewed from below FIG. 2;

FIG. 4 is a perspective view thereof shown in a position of use on a thigh of a pilot;

FIG. 5 is a sectional view of the apparatus taken substantially along line 5—5 of FIG. 1;

FIG. 6 is a plan elevational view of the apparatus similar to FIG. 1 but with the housing portion of the apparatus inverted;

FIG. 7 is an enlarged fragmentary sectional view taken from within the circle 7 of FIG. 5;

FIG. 8 is a schematic illustration of an electrical circuit forming part of the apparatus.

Figure 9:
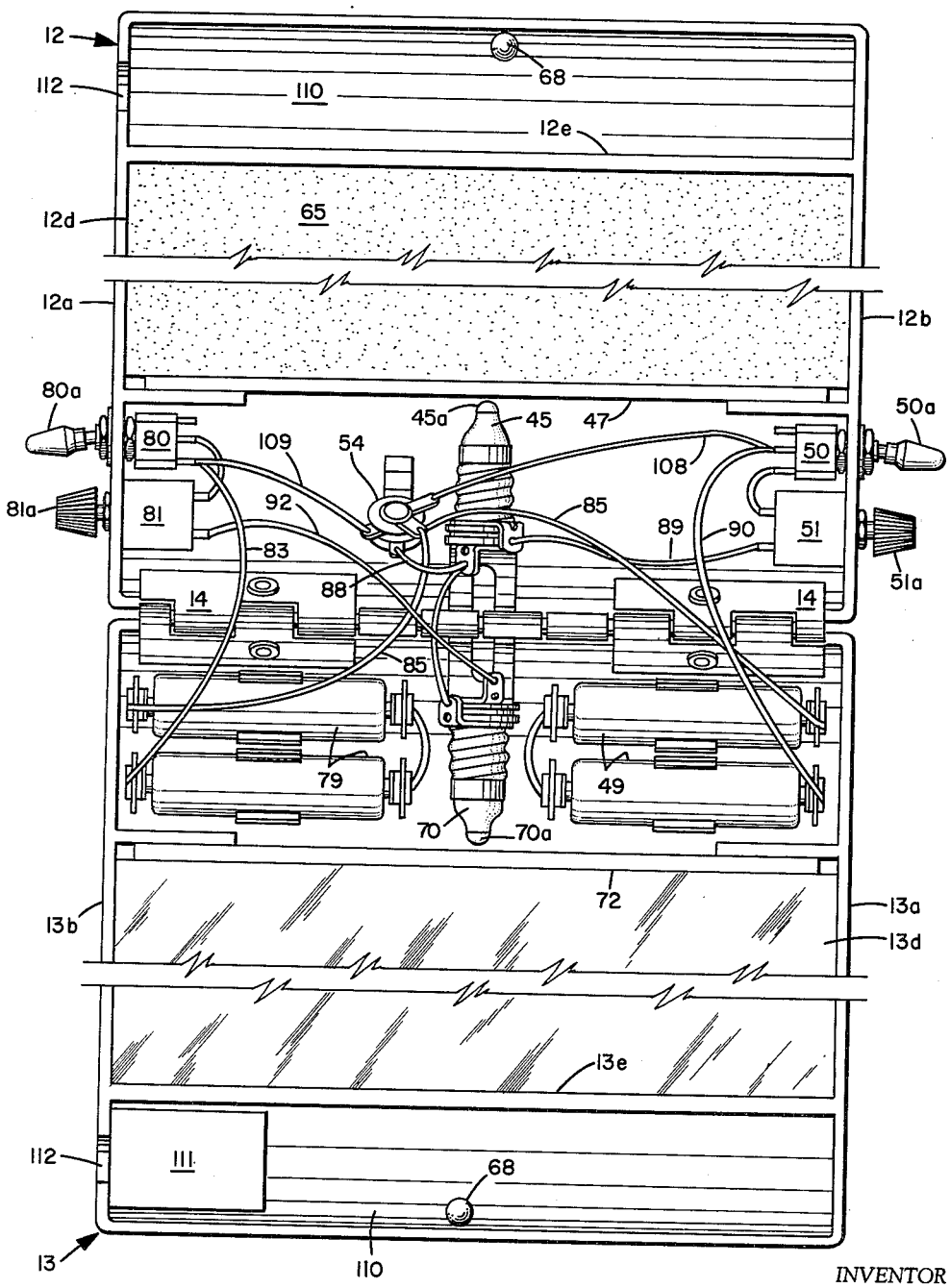
FIG. 9 is an enlarged plan view of the apparatus in an opened position, with portions broken out.

In the form of the invention illustrated in the drawings and described hereinafter, there is provided a flight log and approach chart presentation apparatus generally indicated at 10 and referred to hereinafter simply as the apparatus 10. The apparatus 10 comprises a housing 11 which is generally rectangular in plain view as seen in FIG. 1 and which includes first and second housing sections 12 and 13 connected together at one end by hinges 14. The hinges 14 permit opening of the housing sections 12 and 13 in the manner of a book for the introduction of or changing of apirport landing approach charts in a manner which will be explained more fully hereinafter.

The apparatus 10 further comprises means for supporting the apparatus on the thigh or knee of an airplane pilot P as illustrated in FIG. 4. The supporting means comprises a spring metal clamp member 20 having upturned end portions 21 which releasably grip the sides of one of the housing sections 12 and 13, the clam member shown in gripping relation to the housing section 13 in FIG. 2 and in gripping relation to the housing section 12 in FIG. 6.

The clamp member 20 is pivotally secured by means of a bolt or rivet 23 (FIG. 5) to a somewhat flexible base member 24 which is conveniently formed of a suitable plastic material such as polyethylene. The rivet 23 extends through a washer 23a interposed between the base member 24 and the clamp member to aid in pivotal movement thereof. The base member 24 is generally oblong in plan configuration and is curvable about the upper portion of a wearer's thigh or leg as shown in FIG. 4, and to be secured thereon by an adjustable strap 25.

One end 25a of the strap 25 is conveniently fixed to the base member 24 by looping through a bar 26 formed at one end of the base member, while the other end 25b of the strap 25 is removably secured to the other end of the base member 24 by a suitable releasable snap fastener 27. The strap 25 is preferably provided with a buckle 28, by which the effective length of the strap 25 may be adjusted. The underside of the base member 24 is preferably provided with a soft pad 30 formed of a cushioning materal such as polyurethane foam plastic.

The upturned ends 21 of the clamp member 20 each have a central portion 21a formed into a spring roll disposed between spaced portions 21b which also formed into spring rolls. The rolled portion 21a and the rolled portion 21b are laterally displaced so as to provide a convenient means for releasably holding a writing pencil, illustrated in dot-dash lines at 32, at either end of the clamp member 20.

The clamp member 20 being pivoted by rivet means 23 to the base member 24 permits the housing 11 of the apparatus 10 to be rotated by the pilot P to a position wherein he can write comfortably on the surface thereof. Moreover, the rotative coupling permits aligning of the base member 24 with the longitudinal dimension of the housing 11 so that the apparatus 10 will require a minimum of storage space, an important consideration in apparatus to be carried in an aircraft.

Turning now to the construction of the housing, the section 12 comprises parallel side walls 12a and 12b joined by a front wall 12c and a rear wall 12d. The side walls 12a and 12b are tapered so that the front and rear walls 12c and 12d are slightly inclined with respect to one another as illustrated in the drawings so as to define therebetween a wedge shaped space 36. These walls are conveniently formed of a non-magnetic material, such as a rigid molded plastic aluminum, out of consideration for magnetic aircraft compasses which will be in the proximity of use of the apparatus 10. The front wall 12c is provided with a large rectangular opening in which is fixed a translucent panel 40, preferably formed of a suitable rigid plastic and having a slightly roughened or matte surface 41 capable of being written upon by an ordinary lead pencil. The surface 41 of the panel 40 has printed thereon with permanent ink a flight log form which may be filled in by pencilled notations made by the pilot during flight.

For use at night or during other conditions of low visibility or darkness, the apparatus 10 comprises means for illuminating the panel 40 from the interior of the apparatus, thereby avoiding glare from exposed lamps shining directly upon a conventional flight log paper pad. To this end, the housing section 12 is provided with an electric lamp 45 supported by a suitable socket 46 in the end portion of the housing section 12 adjacent the hinges 14. The lamp 45 is of the focused beam type incorporating an integral lens 45a, and is aimed into the wedge shaped space 36 between the panel 40 and the rear wall 12d of the housing section 12 from the thicker end thereof toward the thiner end. Interposed between the bulb lens 45a and the space 36 is a translucent light diffuser member 47 which partially diffuses the focused beam of light emanating from the bulb 45, thereby tending to illuminate the panel 40 generally evenly throughout its length and width. In addition, the rear wall 12d is provided with a reflecting surface 48 which, because of the partially diffused nature of the light entering space 36, and because the panel 40 is inclined to be closer to the rear wall 12d in a direction going away from the lamp 45, aids in illuminating the panel 40 evenly throughout its area.

The lamp 45 is energized by dry cell batteries 49 contained within the apparatus 10 and may be turned off and on by a switch 50 mounted on side wall 12b and having a suitable switch handle 50a. The intensity of the lamp 45 is controlled by a variable resistor 51 which is also mounted on side wall 12b and is provided with a suitable control knob 51a. Alternatively the lamp 45 may be energized from an exterior source of power such as an aircraft electrical system, and for this purpose the apparatus 10 is provided with a socket 54 for receiving an electrical plug 55 connected to the aircraft electrical system. The preferred circuit connections between the various electrical components of the apparatus 10 will later be described in more detail.

The housing section 13 comprises spaced parallel side walls 13a and 13b interconnected by a front wall 13c and a rear wall 13d. The rear wall 13d comprises a clear, transparent plastic panel, while the walls 13a and 13b and 13c are formed of a suitable non-magnetic material similar to the walls of the housing section 12 described above. The front wall 13c is provided with a large rectangular window in which is secured a transparent panel 60 preferably formed of a transparent plastic and disposed at a slight angle with respect to the clear plastic rear wall 13d which is superimposed against the rear wall 12d of the housing section 12, when the housing is in a closed position as illustrated in FIGS. 2 and 5. The inwardly facing surface 60a of the transparent panel 60 is partially silvered, on the order of ten percent, so that it has substantial reflecting ability toward the clear rear wall 13d and yet is transparent when viewed from outside the apparatus.

The wall 12d of the section 12 presents a roughened surface 65 (FIG. 7) toward the clear plastic rear wall 13d of section 13. This roughened surface serves to firmly grip a paper approach chart 66 which may be inserted between the walls 12d and 13d by opening the housing section 12 with respect to the section 13 to the dotted line position of FIG. 5, inserting the paper chart 66 between the walls 12d and 13d, and closing the housing sections tightly together in which position they are releasably retained by means of suitable friction latch means 68. When the chart 66 is so positioned, instructions printed on the face thereof are clearly visible through the clear plastic rear wall and panel 60.

In order to provide illumination for the approach chart 66 during periods of darkness, the apparatus 10 comprises an electric lamp 70 mounted in the housing section 13 by a suitable socket 71 and having a prefocused lens portion 70a directing a beam of light through a translucent diffuser element 72 into a wedge shaped space 73 between the partially mirrored inner surface 60a of plastic panel 60 and the rear wall 13d. Because the panel 60 is disposed at a slight angle with respect to the rear wall 13d and, because the inner surface of the panel is partially mirrored, light striking the inner surface of the panel 60 from the bulb 70 at a large angle of incidence is reflected inwardly toward the chart 66, while light reflected from the chart in a direction generally normal to the panel 60 passes through that panel to the eye of the user of the apparatus. By this construction the chart 66 is illuminated substantially uniformly across its surface making it clearly visible to the user, and yet glare from the lamp 70 is eliminated.

The lamp 70, which may be energized by batteries 79 contained within the housing 11, may be turned off and on by means of a suitable switch 80 which is mounted on the side wall 12a of the section 12 and is provided with a suitable handle 80a. The intensity of the lamp 70 may be conveniently adjusted through the agency of a variable resistance 81 also mounted on the side wall 12a and provided with a rotatable knob 81a. Additionally, the bulb 70 may be energized from the previously mentioned external power source when the plug 55 is inserted in the socket 54.

Referring now to FIG. 8, the electrical connections between the various electrical components will be described. When the flight log illuminating lamp 45 is energized from the internal battery source 49, a circuit may be traced from the batteries 49 through a conductor 85, normally closed contacts 86 and 87 of the socket 54, a conductor 88, the lamp 45, a conductor 89, the variable resistor 51, switch 50 and a conductor 90 to the batteries 49. When the bulb or lamp 70 is energized from the internal power supply a circuit may be traced from the batteries 79, through conductor 85, socket contacts 86 and 87, conductor 88, lamp 70, a conductor 92, variable resistor 81, a switch 80, and a conductor 83 to the batteries 79.

In the event it is desired to operate either of the lamps 45, 70 from an external power source such as an aircraft electrical system, the plug 55 is inserted into the socket 54. Plug 55 comprises a conductive end portion 97 which is connected by suitable conductor means 98 to a source of external electric power such as batteries 99, and comprises a second conductive section 100, connected through a suitable dropping resistor 101 and conductor 102 to the external battery 99. The conductors 98 and 102 are advantageously led to a plug (not shown) of the type which may be inserted into a cigarette lighter receptacle found on the instrument panel of many aircraft, this providing connection to the aircraft power supply in a manner which will be readily understood by those skilled in the art to which the invention pertains without further explanation.

The conductive plug sections 97 and 100 are separated by an insulator portion 103. When the plug 55 is inserted in the socket 54, the socket contact 87 is separated from the contact 86 thereby open circuiting the internal batteries 49 and 79. At the same time the conductor portion 100 contacts or engages contact 87, while the conductor portion 97 bridges socket contacts 105 and 106. Accordingly, when the switch 50 is closed a circuit may be traced from the battery 99 through conductor 102, dropping resistor 101, conductive portion 100, socket contact 87, conductor 88, bulb or lamp 45, conductor 89, variable resistance 51, switch 50, conductor 90, a conductor 108, socket contact 106, plug conductor portion 97, conductor 98, to battery 99. Similarly, when the switch 80 is closed a circuit may be traced from the battery 99 through conductor 102, dropping resistor 101, conductive portion 100, socket contact 87, conductor 88, lamp 70, conductor 92, variable resistance 81, switch 80, conductor 83, a conductor 109, contact 105, plug conductor portion 97, and conductor 98 to the external battery or supply 99. The resistor 101 may be eliminated in the event the external battery supply 99 provides a voltage sufficiently close to that provided by the batteries 49 and 79. Of course, the variable resistors 51 and 81 may be utilized in the same manner whether the lamps 45, 70 be energized from the internal or external power source.

When the apparatus 10 is being used during normal flying it is inserted in the clamp member 20 so that the section 12 presenting the flight log panel 40 faces upwardly with the switch handle 50a and rheostat knob 51a in the upper right hand corner as viewed by the user and as illustrated in FIG. 1. When the time to make a landing approach draws near, the user removes the housing 11 from the clamp member 20, turns it over so that the section 13 faces upwardly, and replaces it into the clamp member 20 with the switch handle 80a and rheostat knob 81a now in the upper right hand corner as viewed by the user and illustrated in FIG. 6. It will be recognized, therefore, that the appropriate light switch and intensity controls will always be found at the same location regardless of whether the housing 11 is oriented to present the flight log or the approach chart.

At the end of the housing 11 opposite the hinges 14 there is defined by transverse walls 12e and 13e a chamber 110 in which is conveniently mounted a pencil sharpener 111 into which a pencil may be introduced through a suitable opening 112 defined in side walls 12b and 13a as is illustrated in FIG. 2. The compartment 110 may also be used to carry spare dry cells to replace the batteries 49 and 79 in the event they become exhausted during a flight, and connection to an external power source is not available.

From the foregoing detailed description it will be appreciated that the invention has provided an improved flight log and approach chart presentation apparatus which fulfills the previously set forth objects and advantages as well as others apparent from the description. It will also be appreciated that certain variations and modifications will be apparent to those skilled in the art to which the invention pertains. Accordingly, although the invention has been described in considerable detail with reference to a preferred form of flight log and approach chart presentation apparatus embodying the invention, it will be understood that the invention is not limited thereto but rather the invention includes all those modifications, adaptations, substitutions, and uses as are reasonably embraced by the scope of the claims hereof.

Having described my invention, I claim:

1. A flight log and approach chart presentation apparatus comprising:
    (a) a housing having first and second sections each including spaced side walls joined by a front wall and a rear wall spaced from the front wall, the sections being hinged together at one end for relative movement from a closed position in which said rear walls are in superimposed relation to an open position in which said rear walls are separated to permit a chart to be placed between said rear walls so as to be gripped thereby when in said closed position.
    (b) a translucent panel fixed in an opening in the front wall of said first section,
    (c) the rear wall of said first section presenting a reflective surface toward said translucent panel,
    (d) means for introducing diffused light into the space between said front and rear walls of said first section for illuminating said translucent panel to display markings thereon to a viewer,
    (e) said rear wall of said second section comprising a first transparent panel for engaging a chart when gripped between said rear walls, and said front wall of said second section comprising a second transparent panel spaced from the first transparent panel to permit viewing of said chart through said transparent panels, said second transparent panel having a partially mirrored inner surface facing said first transparent panel, and
    (f) means for introducing diffused light between said transparent panels for illuminating said chart.

2. A flight log approach chart presentation apparatus as defined in claim 1 and wherein said translucent panel has a flight log form printed thereon and comprises a matte finish for receiving pencilled notations.

3. A flight log and approach chart presentation apparatus as defined in claim 1 and comprising support means including a base portion and a clamp member pivotally mounted on said support means, said clamp member releasably holding said housing for pivotal movement with respect to said base portion with one of said sections facing away from said base portion, and said housing means being invertable with respect to said support means so as to be held by said clamp member for pivotal movement with respect to said base portion with the other of said sections facing away from said base portion.

4. A flight log and approach chart presentation apparatus as defined in claim 1 wherein said front and rear walls of said first section are inclined with respect to one another so that the space between said translucent panel and said reflective surface is wedge shaped and the front and rear walls of said second section are inclined with respect to one another so that the space between said transparent panels is wedge shaped, and said means for introducing diffused light comprises electric lamp means disposed adjacent a light diffusing element at the wider end of each of said wedge shaped spaces.

5. A flight log and approach chart presentation apparatus as defined in claim 4 and comprising support means including a base portion and a clamp member pivotally mounted on said support means, said clamp member releasably holding said housing for pivotal movement with respect to said base portion with one of said sections facing away from said base portion, and said housing means being invertable with respect to said support means so as to be held by said clamp member for pivotal movement with respect to said base portion with the other of said sections facing away from said base portion.

6. A flight log and approach chart apparatus as defined in claim 4 and comprising first and second electric lamps for illuminating said translucent panel and said approach chart respectively, said apparatus further comprising first control means for said first lamp, and second control means for said second lamp, said first and second control means being mounted on opposite sides of said housing in symmetrical relation to one another about a predetermined axis of said apparatus, whereby when said first housing section is uppermost said first control means will occupy a predetermined position with respect to an observer, and upon inversion of said housing about said axis so that the second section is uppermost said second control means will occupy said predetermined position.

7. A flight log and approach chart presentation apparatus as defined in claim 6 and wherein said first control means comprises a first switch for electrically connecting said first lamp to battery means carried in said housing, and said second control means comprises a second switch for electrically connecting said second lamp to battery means carried in said housing.

8. A flight log and approach chart presentation apparatus as defined in claim 7 and wherein said first and second control means comprise first and second variable resistances for adjusting the intensity of illumination by said lamps, the apparatus further comprising connector means for alternatively energizing said lamps from said battery means and from an external electrical power source.

References Cited by the Examiner

UNITED STATES PATENTS

| | | | |
|---|---|---|---|
| 1,609,418 | 12/26 | Nechamkin et al. | 40—130 |
| 1,677,977 | 7/28 | Menasco | 240—6.4 |
| 1,930,478 | 10/33 | Jones | 235—61 |
| 2,420,673 | 5/47 | Monrad | 40—28 |

ENGENE R. CAPOZIO, *Primary Examiner.*